US005327555A

United States Patent [19]
Anderson

[11] Patent Number: 5,327,555
[45] Date of Patent: Jul. 5, 1994

[54] METHOD FOR RECONCILING ENTRIES IN A PLURALITY OF SCHEDULES

[75] Inventor: Thomas P. Anderson, Cupertino, Calif.

[73] Assignee: Hewlett-Packard Company, Palo Alto, Calif.

[21] Appl. No.: 655,686

[22] Filed: Feb. 14, 1991

[51] Int. Cl.⁵ .................... G06F 7/06; G06F 15/16
[52] U.S. Cl. .................... 395/600; 364/974; 364/974.7; 364/962; 364/962.1; 364/947.2; 345/169
[58] Field of Search .................... 395/650, 700, 600

[56] References Cited

U.S. PATENT DOCUMENTS

| 4,831,552 | 5/1989 | Scully et al. | 364/518 |
| 4,866,611 | 9/1989 | Cree et al. | 395/600 |
| 5,129,057 | 7/1992 | Strope et al. | 395/161 |

Primary Examiner—Gareth D. Shaw
Assistant Examiner—John Q. Chavis

[57] ABSTRACT

A method may be used for reconciling entries in two or more schedules using a schedule history. If the schedules are in different format, all of the schedules are converted to a single format. Then entries from the schedules are considered, for example, in chronological order. When an entry does not occur in all the schedules, the schedule history is checked for the entry. If the entry is not in the schedule history, the entry is added to any schedule which does not contain the entry. If the entry is not in the schedule history, the entry is deleted from any schedule which contains the entry. The schedule history may be updated concurrent with changes made to the other schedules. Alternately, after the reconciliation is complete the schedule history may be changed to match the reconciled schedules.

10 Claims, 3 Drawing Sheets

METHOD FOR RECONCILING ENTRIES IN A PLURALITY OF SCHEDULES

BACKGROUND

The present invention concerns a method by which a plurality of schedules may be kept for a single individual and entries made to the schedules may be reconciled to a single schedule.

With the advent of increasing sophistication and miniaturization of computing devices, a significant amount of processing power may now be included in a hand-held computing device. One area in which this increased processing power has been utilized is in the area of allowing a schedule or calendar to be implemented by a hand-held computer. For example, the Wizard, available from Sharp Electronic Corporation having a business address of P.O. Box 650 Mahwah, N.J. 07430, is a hand-held device which is able to maintain a calendar or schedule. Other similar products are available, for example, the Boss is available from Casio Electronics Company having a business address at 570 Mount Pleasant Ave. Dover, N.J. 07801.

While keeping a schedule on a hand-held computer allows for great portability of the schedule, it can provide for difficulties when it is necessary to make new entries to or deletions from the schedule by a person who does not currently have the hand-held computer in his possession. For example, when a person on a business trip takes along his hand-held computer, the schedule is then unavailable to be modified by a secretary at the home office.

One solution to the dilemma is to maintain more than one schedule. For example, in addition to a schedule on a hand-held computer, a schedule may be maintained on a main computer such as a personal computer or mini computer. For example, such a schedule is included in the product HPDesk Manager available from Hewlett Packard Company having a business address of 3000 Hanover Street, Palo Alto, Calif., 94304. The HPDesk Manager runs on an HP 3000 Computer, also available from Hewlett Packard Company.

One problem with maintaining two schedules for a single individual, however, is that entries may be added and deleted from each schedule independent of the other schedule. When the schedules are compared, entries may be listed which appear on one schedule and not the other. It can be difficult at times to determine whether an entry appearing on only one schedule should be added to the schedule on which it does not appear, or deleted from the schedule on which it does appear. It is necessary, therefore, to have some means by which the schedules may be reconciled.

SUMMARY OF THE INVENTION

In accordance with the preferred embodiment of the present invention, a method is presented for reconciling entries in two or more schedules using a schedule history. If the schedules are in different format, all of the schedules are converted to a standard format. Then entries from the schedules are considered, for example, in chronological order.

If an entry does not occur in all the schedules the schedule history is checked for the entry. If the entry is not in the schedule history, it is assumed that the entry has been added since the last reconciliation. The entry, therefore, is added to any schedule which does not contain the entry. If the entry is in the schedule history, it is assumed that the entry has been deleted since the last reconciliation. The entry, therefore, is deleted from any schedule which contains the entry. The entries within the schedule history may be updated during the reconciliation concurrent with changes made to entries in the other schedules. Alternately, after the reconciliation is complete the schedule history may be changed to match the reconciled schedules.

DESCRIPTION OF THE PREFERRED EMBODIMENT

In the preferred embodiment of the present invention, a method includes the ability to reconcile entries to schedules each separately maintained by different computing devices. In order to perform the method it is necessary to transfer information between the computing devices. This may be done in one of many ways known in the art.

Figure 1:
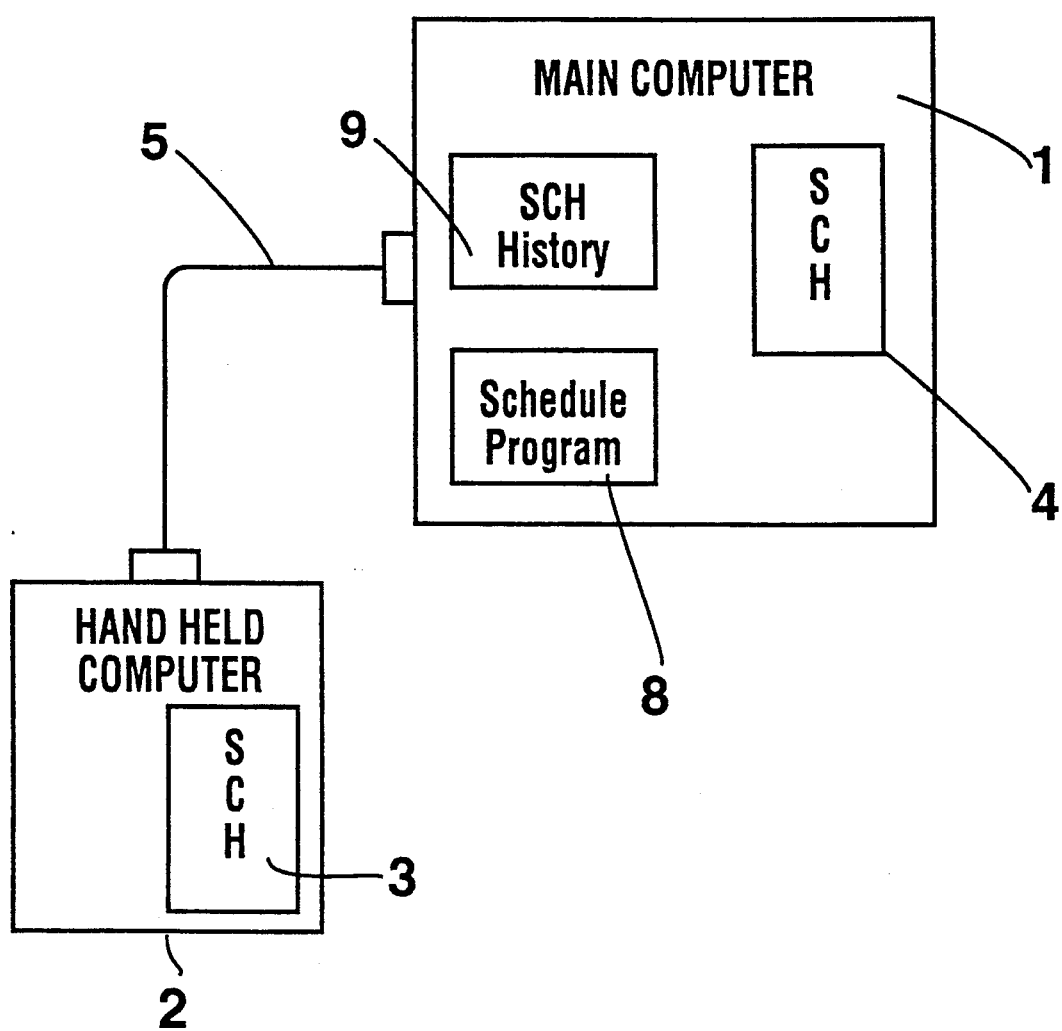
FIG. 1 shows a hand-held computer which includes a schedule connected to a main computer which also includes a schedule in accordance with a preferred embodiment of the present invention.

For example, in FIG. 1, a schedule 3 is shown to be maintained by a hand-held computer 2. A separate schedule 4 is shown to be maintained by a main computer 1. Hand-held computer 2 may be connected to main computer 1 through a serial interface 5. Main computer may be, for example, an HP 3000 or an HP VECTRA personal computer. Hand-held computer 2 may be, for example, a Sharp Wizard. Serial interface 5, may be for instance, an RS 232 serial. A schedule program 8 uses a schedule history 9 to reconcile schedule 3 and schedule 4 using the method of the present invention as will be discussed below.

Figure 2:
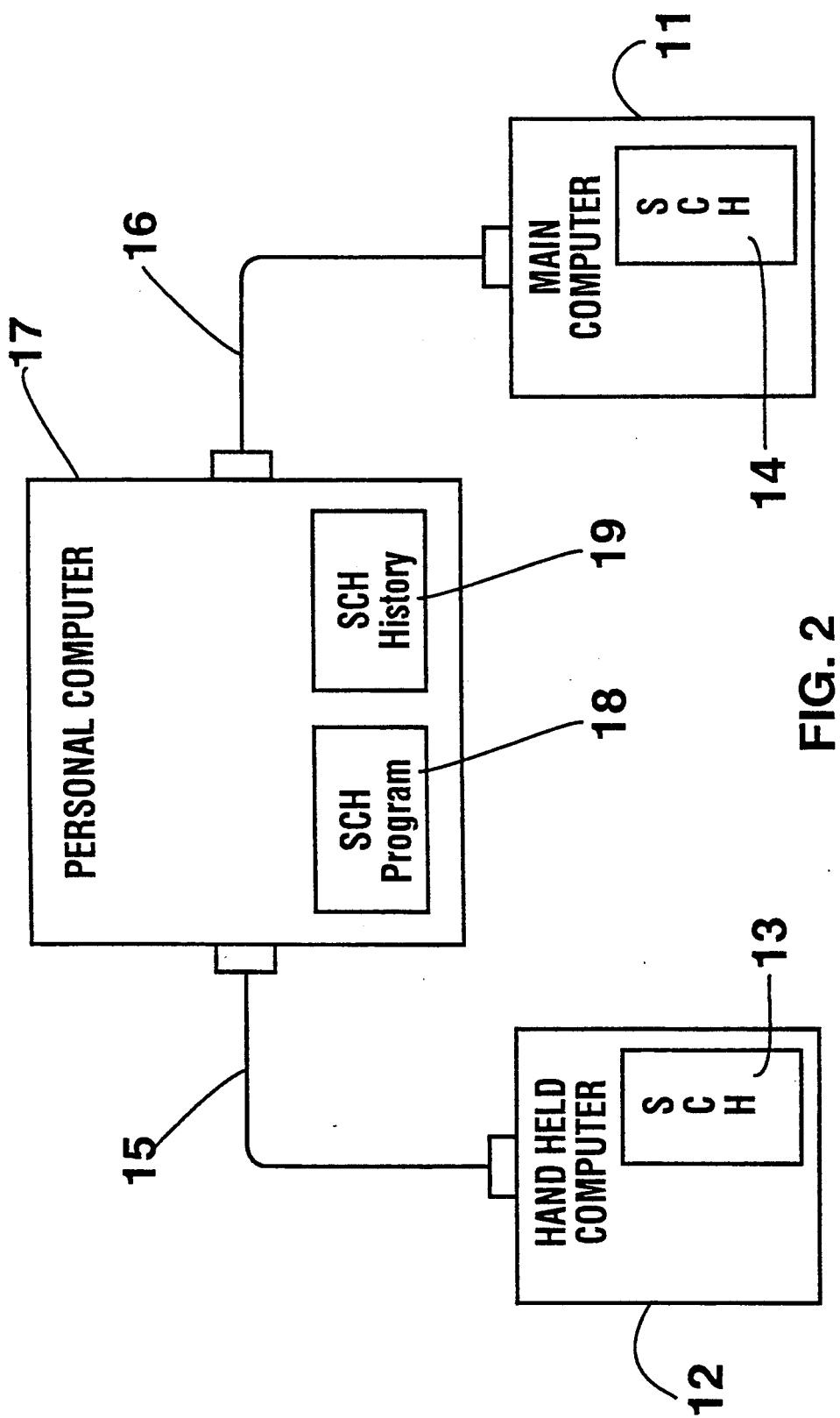
FIG. 2 shows an alternate embodiment of a hand-held computer which includes a schedule connected to a main computer which also includes a schedule through a personal computer.

Alternately, as shown in FIG. 2, a schedule 13 is shown to be maintained by a hand-held computer 12. A separate schedule 14 is shown to be maintained by a main computer 11. Hand-held computer 12 may be connected to main computer 11 through a personal computer 17. Main computer may be, for example, an HP 3000. Hand-held computer 2 may be, for example, a Sharp Wizard. Personal computer 17 may, for example, a Vectra personal computer available from Hewlett Packard Company. A serial interface 15 between hand-held computer 12 and personal computer 17 may be, for example, an RS 232 serial. A serial interface 16 between main computer 11 and personal computer 17 may also be, for example, an RS 232 serial. Resident on personal computer 17 is a schedule program 18 which is used to reconcile entries in schedule 13 with entries in schedule 14. Schedule program 18 uses a schedule 19 when performing the reconciliation.

For example, schedule 13 and schedule 14 are two separate schedules maintained for a single individual. Periodically, hand-held computer 12 and main computer 11 are both connected to personal computer 17 and schedule program 18 reconciles entries on each of the separate schedules. During this reconciliation, each of schedule 13 and schedule 14 are updated with entries and deletions that were initially recorded on the other schedule. At the completion of the reconciliation, entries in both schedules are the same. A record of this reconciled schedule is maintained in schedule history 19 to be used in the next reconciliation.

Figure 3:
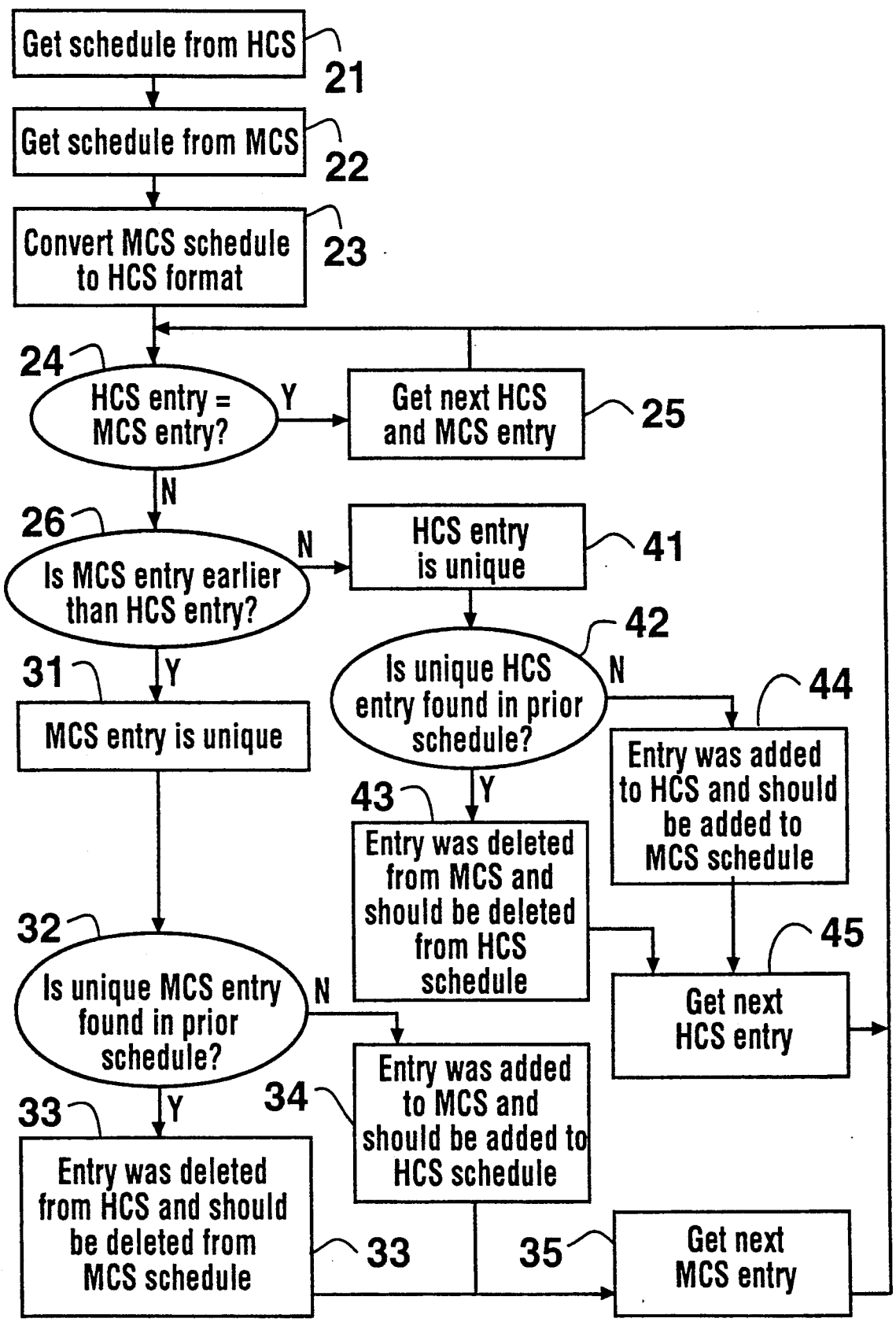
FIG. 3 is a flow chart which shows how entries in two separate schedules may be reconciled with a third schedule in accordance with the preferred embodiment of the present invention.

FIG. 3 is a flowchart which shows how schedule program 18 may reconcile schedule 13 in hand-held computer 12 and schedule 14 in main computer 11 using schedule history 19. In flowchart 3, HCS refers to schedule 13 originally in hand-held computer 12 and MCS refers to converted schedule 14 originally in main computer 11. In a step 21, schedule 13 is uploaded through serial interface 15 to personal computer 17. In a step 22, schedule 14 is downloaded through serial interface 16 to personal computer 17. In a step 23, within personal computer, the downloaded schedule 14 is converted to the same format as schedule 13.

In the remaining steps of the flowchart shown in FIG. 3, the entries within schedule 13 and schedule 14 are compared. For entries which are within one schedule but not another, schedule program 18 uses schedule history 19 to determine which of the entries to keep and which to discard.

The entries are retrieved from each schedule in chronological order. Once a first entry is retrieved from each of converted schedule 14 and schedule 13, the two entries are compared in a step 24. If the entries are the same, in a step 25, the next entry from schedule 13 and converted schedule 14 are retrieved. Otherwise, in a step 26, the dates of the initially retrieved entries are compared.

If the retrieved entry from converted schedule 14 is earlier, the entry from converted schedule 14 is determined to be a unique entry not found in schedule 13, as noted in a step 31. In a step 32, schedule history 19 is checked to determine whether history schedule 19 contains the unique entry. If so, schedule program 18 determines that the unique entry is unique because it was deleted from schedule 13. Therefore, in a step 33, the unique entry is deleted from converted schedule 14. If the unique entry is not in schedule history 19, schedule program 18 determines that the unique entry is unique because it was added to schedule 14. Therefore, in a step 34, the unique entry is added to schedule 13. Then in a step 35, the next entry from converted schedule 14 is obtained.

If the retrieved entry from converted schedule 14 is not earlier, the entry from schedule 13 is determined to be a unique entry not found in schedule 14, as noted in a step 41. In a step 42, schedule history 19 is checked to determine whether history schedule 19 contains the unique entry. If so, schedule program 18 determines that the unique entry is unique because it was deleted from schedule 14. Therefore, in a step 43, the unique entry is deleted from schedule 13. If the unique entry is not in schedule history 19, schedule program 18 determines that the unique entry is unique because it was added to schedule 13. Therefore, in a step 44, the unique entry is added to schedule 14. Then in a step 45, the next entry from converted schedule 14 is obtained.

The process continues until there are no more entries in either schedule 13 or schedule 14. At that time, schedule 13 and converted schedule 14 will be the same. A copy of this reconciled schedule is kept as schedule history 19. Schedule 13, as modified, may then be downloaded to hand-held computer 12; and, schedule 14, as modified, may then be converted back to its original format and uploaded to main computer 11.

For example, Table 1 shows an initial state of schedule 13, schedule 14 and schedule history 19 immediately after schedule 13 and schedule 14 have been reconciled.

TABLE 1

| Thursday, May 2, 1991 | |
|---|---|
| 8:00 A.M.–9:00 A.M. | Meet with John Ryan |
| 9:00 A.M.–12:00 P.M. | Project Review |
| 1:00 P.M.–5:00 P.M. | Competitive Analysis |
| Friday, May 3, 1991 | |
| 7:30 A.M.–8:30 A.M. | Breakfast with Nancy |
| 9:00 A.M.–12:00 P.M. | Staff Meeting |

Since the schedules have just been reconciled, each of schedule 13, schedule 14 and schedule history 19 have identical entries. Now, after time has passed, schedule 13 and schedule 14 may be modified. For example, Table 2 below shows schedule 13 after schedule 13 has been modified.

TABLE 2

| Thursday, May 2, 1991 | |
|---|---|
| 8:00 A.M.–9:00 A.M. | Meet with John Ryan |
| 9:00 A.M.–11:00 A.M. | Project Review |
| 1:00 P.M.–5:00 P.M. | Competitive Analysis |
| Friday, May 3, 1991 | |
| 7:30 A.M.–8:30 A.M. | Breakfast with Nancy |
| 9:00 A.M.–12:00 P.M. | Staff Meeting |
| 12:00 P.M.–1:00 P.M. | Lunch with Bob |

Table 3 below shows schedule 14 after schedule 14 has been modified.

TABLE 3

| Thursday, May 2, 1991 | |
|---|---|
| 8:00 A.M.–9:00 A.M. | Meet with John Ryan |
| 9:00 A.M.–12:00 P.M. | Project Review |
| 1:00 P.M.–5:00 P.M. | Competitive Analysis |
| Friday, May 3, 1991 | |
| 9:00 A.M.–12:00 P.M. | Staff Meeting |
| 12:00 P.M.–1:00 P.M. | Lunch with Nancy |

Schedule 13 and schedule 14 may then be reconciled in accordance with the method described by the flowchart shown in FIG. 3. For example, the first entry in schedule 13 is "8:00 A.M.–9:00 A.M. Meet with John Ryan." The first entry in schedule 14 is "8:00 A.M.–9:00 A.M. Meet with John Ryan." In step 24, schedule program 18 will determine that these entries are equal, and in step 25 the next entry for both schedule 13 and schedule 14 will be obtained.

The next entry for schedule 13 is "9:00 A.M.–11:00 A.M. Project Review." The next entry for schedule 14 is "9:00 A.M.–12:00 P.M. Project Review." These are not the same. In step 26 schedule program 18 will determine that the schedule entry for schedule 14 is not earlier than the schedule entry for schedule 13. In step 42, the schedule entry for schedule 13 will not be found in history schedule 19, as shown in Table 1. Therefore, in step 44, this entry will be added to schedule 14.

In step 45, the next entry for schedule 13 will be obtained: "1:00 P.M.–5:00 P.M. Competitive Analysis." In step 24, this entry will be compared with the entry from schedule 14: "9:00 A.M.–12:00 P.M. Project Review." These are not the same. In step 26 schedule program 18 will determine that the schedule entry for schedule 14 is earlier than the schedule entry for schedule 13. In step 32, the schedule entry for schedule 14 will be found in history schedule 19, as shown in Table 1. Therefore, in step 33, this entry will be deleted from schedule 14.

In step 35, the next entry for schedule 14 will be obtained: "1:00 P.M.–5:00 P.M. Competitive Analysis." In step 24, this entry will be compared with the entry from schedule 13: "1:00 P.M.–5:00 P.M. Competitive Analysis." These are the same. Therefore, in step 25, the next entry for both schedule 13 and schedule 14 will be obtained.

The next entry for schedule 13 is "7:30 A.M.–8:30 A.M. Breakfast with Nancy" on Friday May 3, 1991. The next entry for schedule 14 is "9:00 A.M.–12:00 P.M. Staff Meeting." These are not the same. In step 26 schedule program 18 will determine that the schedule entry for schedule 14 is not earlier than the schedule entry for schedule 13. In step 42, the schedule entry for schedule 13 will be found in history schedule 19, as shown in Table 1. Therefore, in step 43, this entry will be deleted from schedule 13.

In step 45, the next entry for schedule 13 will be obtained: "9:00 A.M.–12:00 P.M. Staff Meeting." In step 24, this entry will be compared with the entry from schedule 14: "9:00 A.M.–12:00 P.M. Staff Meeting." These are the same. Therefore, in step 25, the next entry for both schedule 13 and schedule 14 will be obtained.

The next entry for schedule 13 is "12:00 P.M.–1:00 P.M. Lunch with Bob". The next entry for schedule 14 is "12:00 P.M.–1:00 P.M. Lunch with Nancy." These are not the same. In step 26, schedule program 18 will determine that the schedule entry for schedule 14 is not earlier than the schedule entry for schedule 13. In step 42, the schedule entry for schedule 13 will not be found in history schedule 19, as shown in Table 1. Therefore, in step 44, this entry will be added to schedule 14.

In step 45, schedule program 18 will discover there are no more entries in schedule 13. Therefore, in step 24, the entry for schedule 14, "12:00 P.M.–1:00 P.M. Lunch with Nancy," will be found not equal to the entry for schedule 13. In step 26, schedule program 18 will determine that the schedule entry for schedule 14 is earlier than the schedule entry for schedule 13. In step 32, the schedule entry for schedule 14 will not be found in history schedule 19, as shown in Table 1. Therefore, in step 34, this entry will be added to schedule 13. In step 25, schedule program 18 will discover there are no more entries in schedule 14. Therefore, the reconciliation of the schedules will be complete. At the end of the reconciliation schedule 13 and schedule 14 will be identical and will each be equal to the schedule shown in Table 4 below:

TABLE 4

| Thursday, May 2, 1991 | |
|---|---|
| 8:00 A.M.–9:00 A.M. | Meet with John Ryan |
| 9:00 A.M.–11:00 A.M. | Project Review |
| 1:00 P.M.–5:00 P.M. | Competitive Analysis |
| Friday, May 3, 1991 | |
| 9:00 A.M.–12:00 P.M. | Staff Meeting |
| 12:00 P.M.–1:00 P.M. | Lunch with Bob |
| 12:00 P.M.–1:00 P.M. | Lunch with Nancy |

This schedule will be loaded into schedule history 19 in order to be ready for the next schedule reconciliation.

It may be noted that on Friday, May 3, 1991, from 12:00 P.M.–1:00 P.M. there exists a conflict. Specifically, during this time there is scheduled both a lunch with Bob and a lunch with Nancy. The present method makes no effort to eliminate such conflicts. Rather, both events are entered onto the schedule. If desired, these conflicts may be automatically brought to the attention of a user upon completion of the reconciliation. Alternately, the conflicts may be listed in response to a request by the user.

In the foregoing discussion of the preferred embodiment, only two schedules were reconciled. However, the method of the present invention may be generalized to reconcile any number of schedules. For each of the schedules, the earliest entry is obtained. If the entry is the same for all the schedules, the entry remains on the schedules and the next entry for each of the schedules is obtained.

When the entries for all the schedules are not the same, the earliest entry is examined. If this entry is in the schedule history, the entry is removed from all the schedules on which it appears. If the entry is not in the schedule history, the entry is added to all the schedules on which it does not appear. For all schedules which contain the earliest entry, the next entry is obtained and the process continued until all the entries in each schedule has been considered. During the reconciliation, entries in the schedule history may be updated concurrent with changes made to the other schedules. Alternately, after the schedules have been reconciled, the schedule history may be updated to be equivalent to the other schedules.

In addition to schedules, the teaching of the present invention may be adapted to the reconciliation of any two or more lists where more than one copy is kept in a physically separate location. For example, the present may be adapted to reconciling versions of an address and/or phone list kept and updated by two separate people.

The above discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. In a computer, a method for reconciling entries in a plurality of schedules using a schedule history which includes entries from a last reconciliation, the schedule history not being one of the plurality of schedules and the method, performed by the computer, comprising the step of:

(a) for every entry which is not listed in all schedules in the plurality of schedules performing the following substeps:

(a1) if the entry is listed in the schedule history, deleting the entry from all schedules in the plurality of schedules in which the entry appears; and, (a2) if the entry is not listed in the schedule history, adding the entry to all schedules in the plurality of schedules in which the entry does not appear;

wherein each entry in the plurality of schedules comprises a time and an activity associated with the time.

2. A method as in claim 1 additionally comprising the step of:

(b) upon completion of step (a) updating the schedule history to include only entries in all of the schedules in the plurality of schedules.

3. A method as in claim 1 additionally comprising the step of:

before performing step (a), when every schedule in the plurality of schedules is not in a standard format, converting each schedule not in the standard format into the standard format.

4. A method as in claim 1, wherein in step (a), entries are considered in chronological order.

5. A method as in claim 1, additionally comprising the step of:

(b) after step (a) is completed, displaying to a user a list of all entries in the schedules which have time conflicts.

6. A method as in claim 1 wherein the plurality of schedules include a first schedule and a second schedule and wherein in step (a)

when an entry is added to the first schedule, the entry is also added to the schedule history;

when an entry is added to the second schedule, the entry is also added to the schedule history;

when an entry is deleted from the first schedule, the entry is also deleted from the schedule history; and, when an entry is deleted from the first schedule, the entry is also deleted from the schedule history.

7. In a computer, a method for reconciling entries in a plurality of lists using a list history which includes entries from a last reconciliation, the list history not being one of the plurality of lists and the method, performed by the computer, comprising the step of:

(a) for every entry which is not listed in all lists in the plurality of lists performing the following substeps:

(a1) if the entry is listed in the list history, deleting the entry from all lists in the plurality of lists in which the entry appears; and, (a2) if the entry is not listed in the list history, adding the entry to all lists in the plurality of lists in which the entry does not appear.

8. A method as in claim 7 additionally comprising the step of:

before performing step (a), when every list in the plurality of lists is not in a standard format, converting each list not in the standard format into the standard format.

9. A method as in claim 7 wherein the lists include names, addresses and phone numbers.

10. A method as in claim 7, additionally comprising the step of:

(b) after step (a) is completed, displaying to a user all entries in the lists which have conflicts.

* * * * *